UNITED STATES PATENT OFFICE.

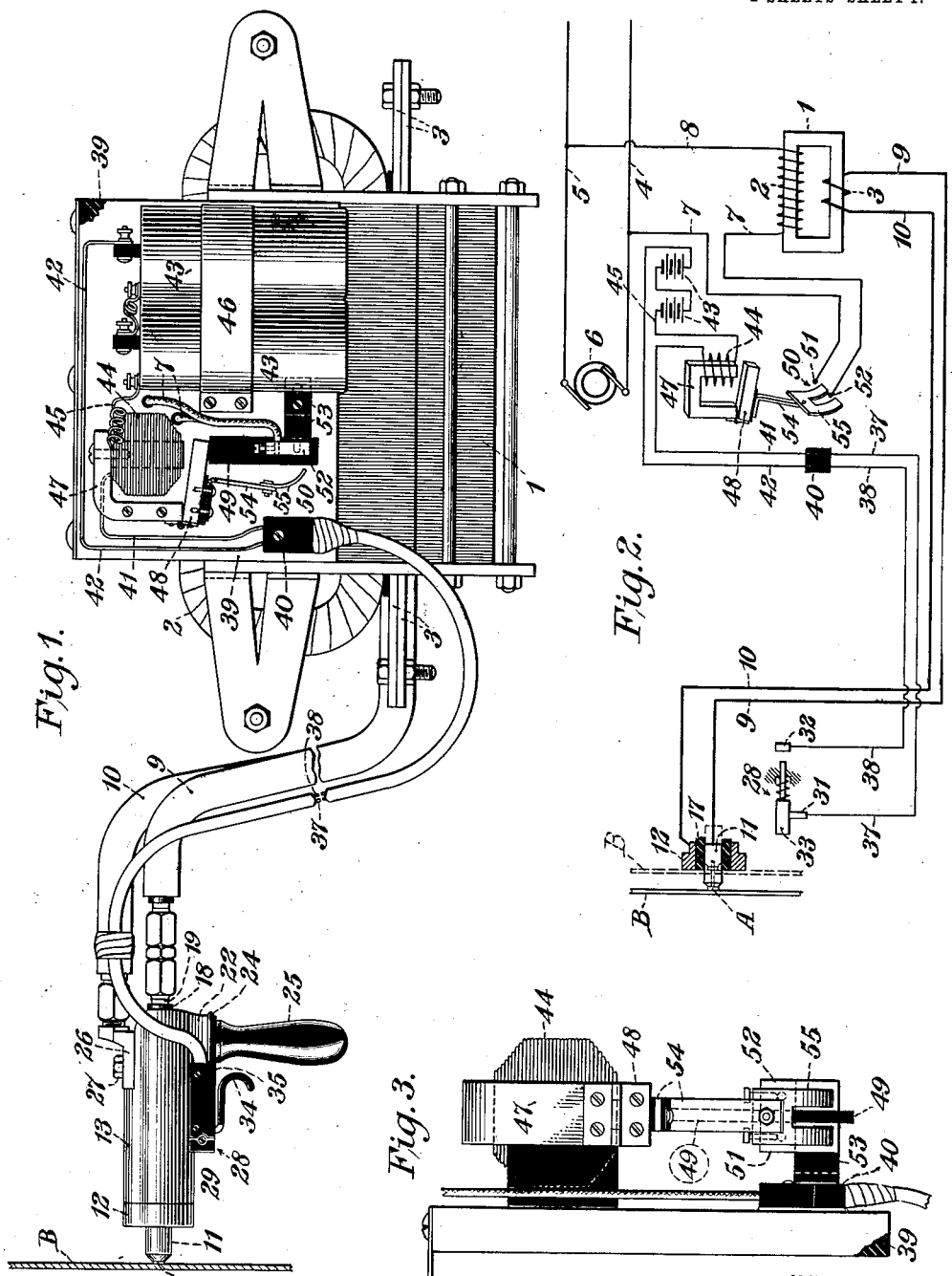

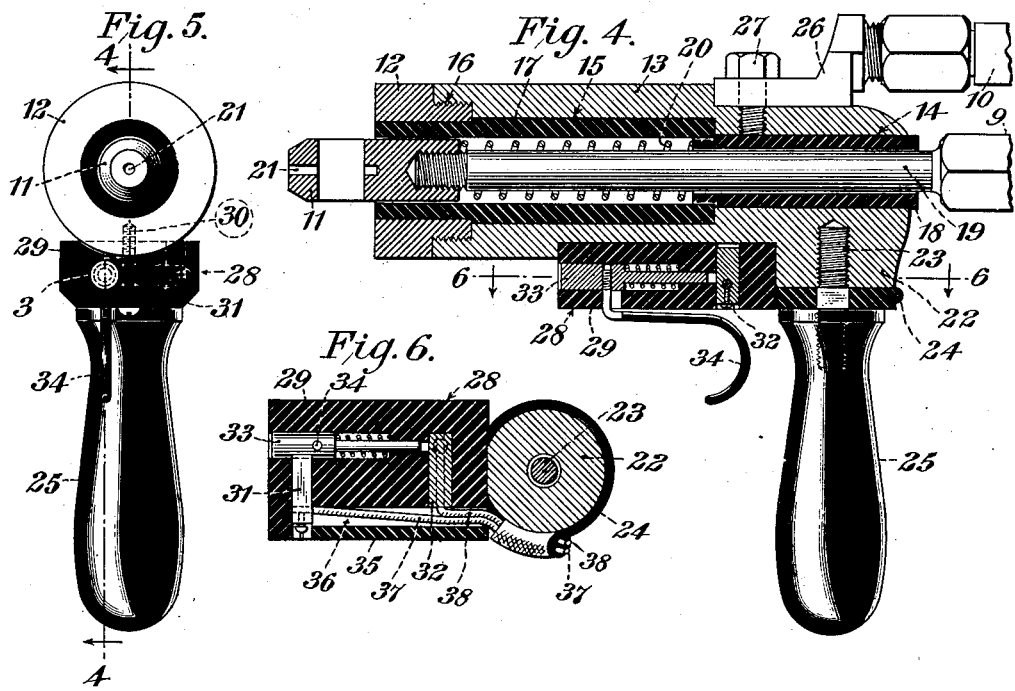

SAMUEL S. MORGAN, OF ST. CHARLES, MISSOURI, ASSIGNOR TO AMERICAN CAR AND FOUNDRY COMPANY, OF ST. LOUIS, MISSOURI, A CORPORATION OF NEW JERSEY.

ELECTRIC WELDING APPARATUS.

1,109,592. Specification of Letters Patent. Patented Sept. 1, 1914.

Application filed May 23, 1914. Serial No. 840,543.

*To all whom it may concern:*

Be it known that I, SAMUEL S. MORGAN, residing at St. Charles, St. Charles county, Missouri, and being a citizen of the United States, have invented certain new and useful Improvements in Electric Welding Apparatus, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a front elevation of the welding apparatus, showing the gun-shaped welding tool in position to perform work. Fig. 2 is a diagrammatic view of the electrical circuits. Fig. 3 is a side elevation of the automatic primary circuit-closing switch mounted upon its panel. Fig. 4 is a vertical longitudinal section of the gun-shaped welding tool taken on line 4—4, of Fig. 5, some of the parts being shown in elevation. Fig. 5 is an end view of the gun-shaped welding tool shown in Fig. 4. Fig. 6 is a horizontal section of the operating switch carried by the tool, and is taken on line 6—6 of Fig. 4.

In the machine shops of various industries, there are departments which are confronted with the problem of finding appropriate means for attaching relatively small metallic pieces to other pieces of metal, which may be and often are of much greater dimensions. For one reason, or another, the use of screws and the processes of lead soldering and brazing must frequently be rejected as unsuitable, and welding is resorted to. These conditions obtain in the construction of steel cars, particularly where it is desired, for instance, to secure to the metallic sheathing or walls means, as ordinary nails, for holding insulation, though, of course, other small pieces for this, or other purposes, may be attached by use of the apparatus herein disclosed.

An object of the invention is to provide a primary switch which is readily operable by a very low voltage, such as may be supplied by even a pair of dry batteries. The arrangement is such that there is a maximum conservation of electrical energy, as neither the relay coil of the primary switch just referred to, nor the primary winding of the transformer, and hence the secondary winding thereof, is energized, except when work is being performed.

Another advantage is that a constant pressure is automatically maintained on the nail, tack or other piece, during the welding operation, through the agency of the coil spring backing the movable electrode, thus eliminating to at least a great extent the human equation in this respect, as the operator is not called upon to exercise judgment.

Additional advantage is secured in making one of the welding electrodes a ring, concentrically surrounding another inner and movable electrode, whereby the welding current passes from one electrode through the metal piece, as a steel sheet, to which the work is being affixed, to the other electrode, along radial paths disposed in all directions. This very materially reduces the resistance to the welding current through the steel sheet, or metal piece, and the welding is accomplished with less voltage.

By reason of the light construction of the gun-shaped welding tool, it may easily be manipulated with one hand without fatigue, and with great accuracy.

In the drawings, 1 indicates any type of transformer suitably wound for welding purposes, and has a primary winding 2 and a heavy secondary 3. The primary 2 is connected across the line 4—5, running from an alternating current generator 6, by conductors 7 and 8. From secondary winding 3, long flexible conductors 9 and 10 runs, respectively, to welding electrodes 11 and 12, preferably composed of copper.

What will hereafter be termed the gun, has a substantially cylindrical or barrel-shaped body 13, which for the sake of lightness may be made of aluminum. The body is centrally bored out, as at 14, is counter-bored at 15, and further counter-bored at 16, the latter counter-bore being provided with a female thread. Inserted into counter-bore 15, preferably co-extensive therewith, and having a portion of slightly decreased diameter extending through and beyond the end counter-bore 16, is an insulating tube 17. Occupying and extending in both directions beyond bore 14, and having a slightly reduced end portion telescoped within insulating tube 17, is another insulating tube 18. The latter tube acts as a guide for plunger 19, to one end of which is attached the secondary conductor 9, while upon the other end is secured the removable welding electrode 11, which additionally serves as another guide for said plunger. Electrode 12 surrounds the diminished end portion of insulating tube 17, and has a reduced screw threaded portion screwed into counter-bore 16. Encircling plunger 19, bearing against the inner ends of electrode 11 and insulating tube 18, and occupying the cylindrical chamber within insulating tube 17, is a coil spring 20, normally projecting a considerable portion of electrode 11 beyond the outer face of electrode 12. Electrode 11 contains in its outer end a work-holding recess 21, here shown as a drilling adapted to receive and hold a nail, though for other objects its shape will conform to that best adapted to hold them.

The butt end of the body or barrel 13 has an approximately cylindrical downward projection or boss 22, having a threaded tap into which is screwed one end of a stud 23 threaded at both ends. An insulating distance washer 24 is interposed between body projection 22 and an insulating handle 25, which is screwed onto the lower end of stud 23. On its upper surface, body 13 is recessed to receive a terminal block 26, secured thereto by a tap bolt 27, and to which secondary conductor 10 is attached. On its underside, and in advance of projection or boss 22, the body 13 is further recessed for the reception of the operating switch 28, which comprises a main body portion 29, of insulating material, which is fastened by screws 30, (see Fig. 5), to the body 13.

Terminal blocks 31 and 32 are located in the insulating body portion 29, and a spring pressed circuit-closing plunger 33 having a tail is positioned within a cylindrical recess in said body portion 29, said recess having two diameters, one to substantially fit and guide the plunger 33, and the other the tail of said plunger. Terminal block 31 at all times bears against said plunger. Screwed into plunger 33, and passing downwardly through a movement-limiting aperture in the bottom of said body portion 29, and extending thereafter toward handle 25, is a trigger 34, the free end of which may be suitably shaped to suit the finger of an operator's hand.

Secured to body portion 29 by screws is an insulating cap-plate 35, recessed to provide a duct 36, through which may pass conductors 37 and 38, which are connected, respectively, to terminal blocks 31 and 32. Conductors 37 and 38 are flexible and accompany the secondary conductors 9 and 10 toward the transformer, but run to an insulating panel board 39, attached to transformer 1, where, through connector 40, they join conductors 41 and 42, respectively, the former going to one of the dry batteries 43, and the latter to relay coil 44. Conductor 45 connects the other dry battery and said relay coil. The batteries are secured in any convenient way to the panel board, as by strap 46. Relay coil 44 surrounds one leg of its core 47, and to the lower extremity of the other leg is hinged an armature 48, normally resting upon an insulating strip 49 within the zone of influence of the adjacent magnetic pole of the coil-surrounded leg of core 47.

Interposed in primary conductor 7, between the line conductor 4 and the primary 2 of the transformer, is a primary switch 50 comprising a pair of contacts 51 and 52, preferably of non-magnetic material, as carbon or brass. Contacts 51 and 52 are supported from panel 39 by a bracket 53, of insulating material, and are insulated from each other by insulating strip 49, which intervenes and is also supported from bracket 53.

Supported by but insulated from armature 48 is a depending arm 54 of non-magnetic material, as brass, to the lower end of which is attached a bridging contact 55, preferably of copper or carbon, adapted to connect both contacts 51 and 52 of the primary switch.

The operation of the device is as follows: Desiring to weld a nail to a sheet metal wall of a car, the nail A is inserted into the recess 21 of welding electrode 11, head outermost. With handle 25 properly grasped, the operator places the head of the nail against the metal sheet B, as shown in Figs. 1 and 2. Exerting a thrusting pressure on said handle, the operator causes electrode 11 to recede against the influence of coil spring 20 into insulating tube 17 of the gun. The outer surfaces of the nail head and welding electrode 12 are then in intimate contact with sheet B, and through spring 20 electrode 11 exerts a constant pressure upon said nail head, as shown in dotted lines in Fig. 2. Slipping his finger about the trigger, the operator pulls it and so holds it a requisite length of time. By this action, plunger 33 moves inwardly until its tail contacts with terminal block 32 of the operating switch 28. As best shown in Fig. 2, a circuit is thus completed from batteries 43 by conductors 42 and 38, terminal block 32, the tail of plunger 33, said plunger itself, terminal block 31, conductors 37 and 41, relay coil 44 and conductor 45, to batteries 43. This results in energizing relay coil 44 and the magnetization of its core 47, armature 48 immediately moving upwardly into contact with the adjacent magnetic pole of the coil surrounded leg of the core. Arm 54, carried by said armature then causes the bridging contact 55 of the primary switch 50 to connect the primary switch contacts 51 and 52. A circuit is thus completed from alternating current generator 6 through line conductor 4, a part of primary conductor 7, contact 51, bridging contact 55, contact 52, the remainder of conductor 7, through the primary winding 2, primary conductor 8, line conductor 5 to the generator 6. Thereupon a current is induced in secondary winding 3 from which it may pass through secondary conductor 9, welding electrode 11, nail A, sheet B, welding electrode 12, secondary conductor 10 to the secondary winding 3. The passage of this current welds the nail A to sheet B. After the welding is accomplished, trigger 34 of the gun is released and the spring-pressed plunger 33 moves outwardly, its tail separating from terminal block 32, thus breaking the circuit controlled by operating switch 28. Relay coil 44 becomes deënergized, and armature 48 falls back upon insulating strip 49, causing bridging contact 55 to disengage primary switch contacts 51 and 52, thus opening the circuit which includes the primary winding 2. Thereupon the secondary winding 3 becomes dead, the welding is completed, and the gun may be removed to be loaded with a new nail for application to another place.

What I claim is:—

1. In welding apparatus, a transformer having a primary winding in a normally open primary circuit including a source of energy, electro-magnetically operated means in a control circuit adapted to close said primary circuit upon operation of a circuit closer in said control circuit, and a transformer secondary winding in a work-closed circuit including portable welding electrodes.

2. In welding apparatus, a transformer having primary and secondary windings, the former in an open circuit with a source of energy, and the latter in a normally open circuit with portable welding electrodes, one of which carries work and is adapted to cause the same to contact with associated circuit-closing work before the other electrode, and circuit-closing means in a control circuit having an independent source of energy adapted to actuate means for closing said primary circuit.

3. In welding apparatus, a transformer having primary and secondary windings, the former in an open primary circuit with a source of energy, and the latter in an open circuit with welding electrodes adapted to be closed by work, a control circuit having an independent source of energy and circuit-closing means therefor adapted to actuate a primary circuit-closing switch, comprising a magnetizable core, a relay coil and an armature therefor, and armature supported means carrying a contact adapted to bridge contacts in said primary winding circuit.

4. In welding apparatus, a source of energy connected with a transformer having primary and secondary windings, each winding being in an open circuit, a circuit-closer for said primary winding circuit, flexible leads therefrom and from said secondary winding connected to a portable welding tool, comprising a movable spring-pressed electrode adapted to carry work and cause the same to contact with affiliated work in advance of a relatively stationary electrode, said welding tool having a suitable structure supporting and insulating from each other both said electrodes, and means carried by said structure adapted to actuate said primary winding circuit closer.

5. In welding apparatus, a portable welding tool comprising a hollow current-conducting body portion, a conductor terminal secured thereto and also a welding electrode detachably secured to one end thereof, an internal insulating lining for said body portion, a current-conducting plunger guided by a portion thereof and attached to a conductor and to a work-holding spring-pressed welding electrode movable through, but insulated from, and normally projecting beyond, said first mentioned electrode, a circuit-closer operable by a trigger and carried by but insulated from said body, and an insulating handle for the latter.

6. In welding apparatus, a portable welding tool, comprising a hollow body portion, an internal insulating lining therefor, a pair of welding electrodes insulated from each other, one concentrically surrounding the other and detachably secured to said body portion, and the other resiliently pressed to project beyond the outer electrode, but adapted to be retracted so that both electrodes may engage work at the same time.

7. In a welding apparatus, a portable electric welding tool, comprising a hollow current-conducting body portion, a pair of welding electrodes, one detachably secured to said body portion and concentrically surrounding the other but insulated therefrom, and the other being adapted to carry work and to be resiliently pressed to project in advance of said first mentioned electrode, but adapted to be retracted upon application to a second piece of work to allow both electrodes to make electrical contact with work and electric current to flow from one to the other through said second piece of work in radial lines.

8. In welding apparatus, a transformer having primary and secondary windings, the former in an open primary circuit with a source of energy and circuit closing means, and the latter in an open circuit with welding electrodes and adapted to be closed by work, an open control circuit, an operating switch for closing the same to actuate said primary circuit closing means, the latter comprising an insulating panel and a primary closing switch comprising a magnetizable core, a relay coil and a pivoted armature therefore, a bridging contact supported by but insulated from and movable with said armature, and contacts in said primary circuit insulated from each other and supported from said panel by an insulating bracket, and adapted to be engaged by said bridging contact, and dry batteries mounted on said panel for energizing said control circuit.

9. In welding apparatus, a transformer having primary and secondary windings, the former in an open primary circuit with a source of energy, and the latter in an open circuit with welding electrodes adapted to be closed by work, and carried by a portable gun-shaped welding tool, an open control circuit, means therein for closing said primary circuit, and a switch for actuating said means attached to said tool, and comprising an insulating body, terminal blocks and a circuit-closing plunger therein, the latter permanently in contact with one terminal block and spring-pressed away from the other, a trigger attached to said plunger to move it into contact with the latter terminal block and a removable insulating cap having a duct for the passage of wires to said terminal blocks.

In witness whereof I have hereunto set my hand in the presence of two witnesses.

SAMUEL S. MORGAN.

Witnesses:
F. H. GIBBS,
L. T. CARROLL.